United States Patent
Mehl et al.

(10) Patent No.: US 11,482,047 B2
(45) Date of Patent: Oct. 25, 2022

(54) ML MODEL ARRANGEMENT AND METHOD FOR EVALUATING MOTION PATTERNS

(71) Applicant: Kaia Health Software GmbH, Munich (DE)

(72) Inventors: Konstantin Mehl, Munich (DE); Maximilian Strobel, Munich (DE)

(73) Assignee: KAIA HEALTH SOFTWARE GMBH, Munich (DE)

( * ) Notice: Subject to any disclaimer, the term of this patent is extended or adjusted under 35 U.S.C. 154(b) by 53 days.

(21) Appl. No.: 16/735,132

(22) Filed: Jan. 6, 2020

(65) Prior Publication Data
US 2021/0209350 A1 Jul. 8, 2021

(51) Int. Cl.
*G06K 9/00* (2022.01)
*G06V 40/20* (2022.01)
*G06T 7/20* (2017.01)
*G06T 7/70* (2017.01)
*G06K 9/62* (2022.01)
*G06N 5/00* (2006.01)
*G06N 3/04* (2006.01)

(52) U.S. Cl.
CPC ........... *G06V 40/23* (2022.01); *G06K 9/6267* (2013.01); *G06N 3/04* (2013.01); *G06N 5/003* (2013.01); *G06T 7/20* (2013.01); *G06T 7/70* (2017.01); *G06T 2207/20084* (2013.01)

(58) Field of Classification Search
CPC .................................................. G06K 9/00342
See application file for complete search history.

(56) References Cited

U.S. PATENT DOCUMENTS

| | | | |
|---|---|---|---|
| 9,154,739 B1 | 10/2015 | Nicoiaou et al. | |
| 2009/0062696 A1* | 3/2009 | Nathan | A61B 5/1122 600/595 |
| 2014/0129178 A1* | 5/2014 | Meduna | G06F 3/011 702/189 |
| 2017/0035327 A1* | 2/2017 | Yuen | A61B 5/02438 |
| 2017/0344832 A1* | 11/2017 | Leung | G06K 9/00342 |
| 2018/0330810 A1* | 11/2018 | Gamarnik | G16H 50/50 |
| 2019/0146590 A1* | 5/2019 | Chiang | G06N 3/0445 706/20 |
| 2019/0362506 A1* | 11/2019 | Leroyer | G06T 7/97 |
| 2019/0388728 A1* | 12/2019 | Wang | G06K 9/6298 |

\* cited by examiner

*Primary Examiner* — Hadi Akhavannik
(74) *Attorney, Agent, or Firm* — Birch, Stewart, Kolasch & Birch, LLP

(57) ABSTRACT

A ML model arrangement configured for evaluating motion patterns in a sequence of image data structures is described. The ML model arrangement comprises a first ML model configured for predicting a set of key data elements for each image data structure of the sequence of image data structures, a key data element indicating a respective position of a landmark in the image data structure. The ML model arrangement further comprises at least one second ML model, each second ML model being a ML model configured for evaluating a corresponding specific motion pattern. Each second ML model is configured for determining, based on input data comprising at least one of the key data elements predicted for at least one image data structure or data derived therefrom, class labels for each image data structure, said class labels identifying at least one of: at least one motion phase of the specific motion pattern, at least one evaluation point of the specific motion pattern.

24 Claims, 5 Drawing Sheets

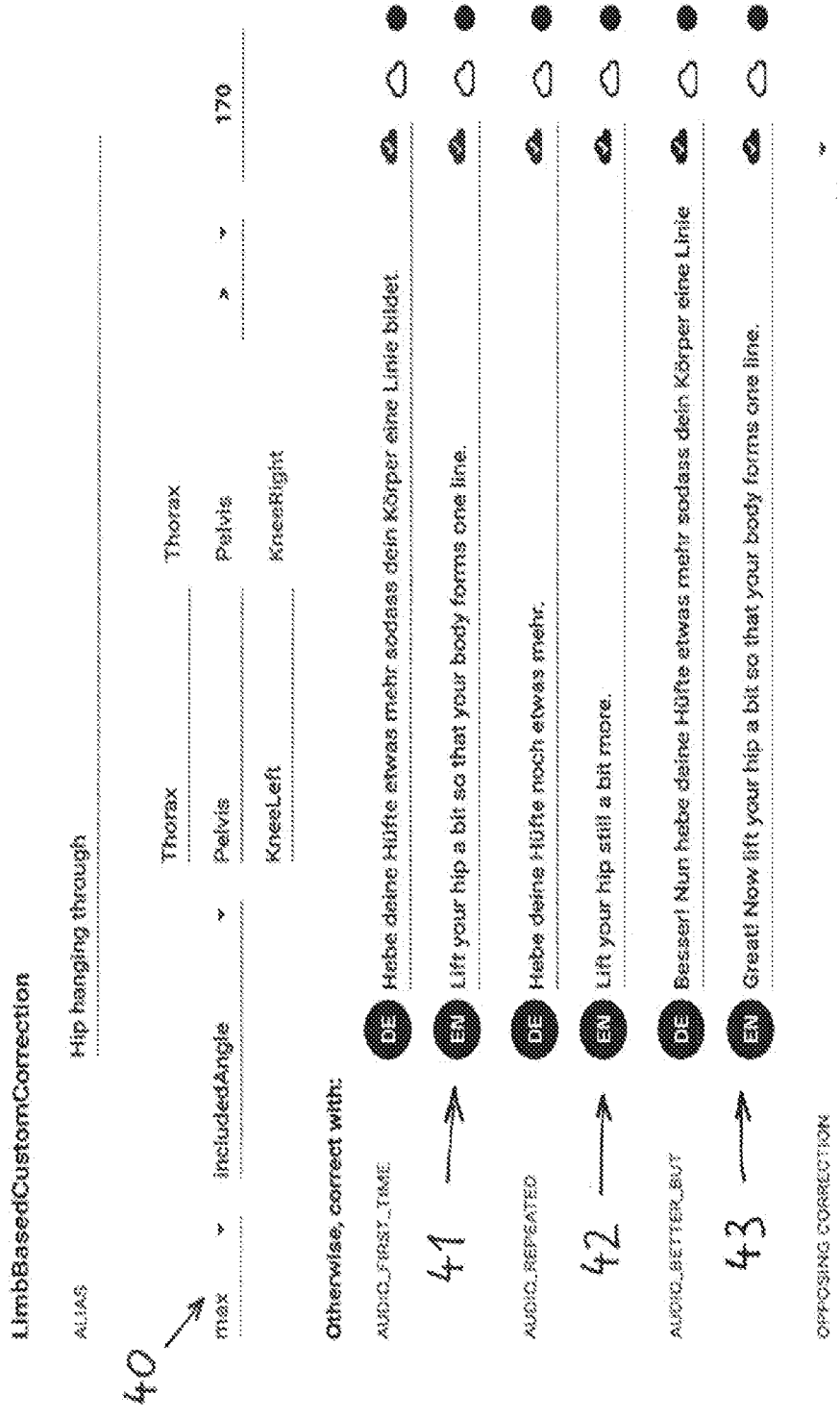

ML MODEL ARRANGEMENT AND METHOD FOR EVALUATING MOTION PATTERNS

FIELD OF THE INVENTION

The invention relates to a ML model arrangement configured for evaluating motion patterns in a sequence of image data structures and to a mobile device comprising a ML model arrangement. The invention further relates to a method for evaluating a motion pattern in a sequence of image data structures. The invention also relates to a method for configuring a second ML model for evaluating a specific motion pattern.

Background of the Invention

U.S. Pat. No. 9,154,739 B1 describes a computer-implemented method, a system and a computer-readable medium that provide useful feedback for a user involved in exercise. A camera is used to track user motion by using image processing techniques to identify key points of a user's body and track their motion. The tracked points are compared to proper form for an exercise, and an embodiment gives feedback based on the relationship between the actual movement of the user and the proper form.

OBJECT OF THE INVENTION

The object of the invention is to provide a method and a system capable of analysing and evaluating motion patterns in a sequence of image data structures.

SUMMARY OF THE INVENTION

According to the invention, a ML model arrangement configured for evaluating motion patterns in a sequence of image data structures is provided. The ML model arrangement comprises a first ML model configured for predicting a set of key data elements for each image data structure of the sequence of image data structures, a key data element indicating a respective position of a landmark in the image data structure. The ML model arrangement further comprises at least one second ML model, each second ML model being a ML model configured for evaluating a corresponding specific motion pattern. Each second ML model is configured for determining, based on input data comprising at least one of the key data elements predicted for at least one image data structure or data derived therefrom, class labels for each image data structure, said class labels identifying at least one of: at least one motion phase of the specific motion pattern, at least one evaluation point of the specific motion pattern.

According to embodiments of the present invention, an arrangement of a first ML model and at least one second ML model is used for evaluating motion patterns in a sequence of image data structures. In the present application, the term "ML" stands for "machine learning". The first ML model is configured for recognising landmarks in the image data structure and for predicting a set of key data elements, wherein a key data element indicates a respective position of a landmark in the image data structure. The second ML model is configured for classifying, based on key data elements provided by the first ML model, each image data set. For each image data set, a class label is determined, wherein the class label indicates at least one of: at least one motion phase, at least one evaluation point. For example, the motion phases of the motion pattern can be identified. Even complex motion patterns can be segmented into a number of motion phases. Furthermore, the second ML model may for example classify an image data structure as being an evaluation point. In case an image data structure is classified as an evaluation point, a further evaluation of the image data structure may for example be performed.

The arrangement of a first ML model and at least one second ML model has proven to be suitable for analysing and evaluating motion patterns in a sequence of image data structures. Both the first and the at least one second ML model are chosen to fulfill their respective tasks in an optimised manner. The first ML model is configured for predicting key data elements, and the second ML model is trained for performing the classification task based on the key data elements provided by the first ML model. For each of these tasks, a different type of ML model can be used. For example, the first ML model may be a convolutional neural network, whereas the second ML model may for example be a decision tree or a random forest. These are only examples, other types of machine learning models may be used as well.

Further according to the invention, a method for evaluating a motion pattern in a sequence of image data structures is provided. The method comprises predicting, using a first ML model, a set of key data elements for each image data structure of the sequence of image data structures, wherein a key data element indicates a respective position of a landmark in the image data structure. The method further comprises determining, using a second ML model, class labels for each image data structure based on input data comprising at least one of the key data elements predicted for at least one image data structure or data derived therefrom, said class labels identifying at least one of: at least one motion phase of the specific motion pattern, at least one evaluation point of the specific motion pattern.

Further according to the invention, a mobile device is provided, the mobile device comprising a ML model arrangement as described above. Preferably, the mobile device further comprises a camera configured for acquiring the sequence of image data structures.

Yet further according to the invention, a method for configuring a second ML model for evaluating a specific motion pattern is provided. The method comprises training the second ML model for classifying at least one of: at least one motion phase of the specific motion pattern, at least one evaluation point of the specific motion pattern. Said training is based on a plurality of sequences of image data structures showing different variants of the specific motion pattern, wherein for each image data structure, a set of key data elements is provided, a key data element indicating a respective position of a landmark in the image data structure. Said training is further based on class labels provided for each image data structure.

The method according to embodiments of the present invention provides a second learning model that is capable of classifying at least one of: at least one motion phase of a specific motion pattern, at least one evaluation point of a specific motion pattern. For this purpose, a training step of the second ML model is performed. The training is based on a plurality of sequences of image data structures showing different variants of the specific motion pattern. Together with each image data structure, a class label is specified. Training of the second ML model is performed based on sequences of image data structures and the corresponding class labels. After the training step has been performed, the second ML model is capable of classifying image data structures in a sequence of image data structures and for providing appropriate class labels indicating at least one of:

at least one motion phase of the specific motion pattern, at least one evaluation point of the specific motion pattern.

PREFERRED EMBODIMENTS OF THE INVENTION

Preferred features of the invention which may be applied alone or in combination are discussed below and in the dependent claims.

ML Model Arrangement

Preferably, each second ML model is configured for determining, for each image data structure of the sequence of image data structures, a corresponding class label. By providing a classification for each image data structure, a complete description of the motion pattern is obtained, which may serve as a basis for further evaluation.

Preferably, each second ML model is of a different type than the first ML model. The first ML model's task is to predict key data elements for each image data structure. The task of the second ML model is to perform a classification of the image data structures and to provide a class label for an image data structure. Preferably, different ML models are used for these different tasks, each ML model being chosen and trained such that the respective task can be fulfilled in an optimised manner.

In a preferred embodiment, each second ML model is configured for determining class labels based on input data comprising key data elements predicted for the image data structure under consideration and for at least one of: at least one preceding image data structure, at least one future image data structure. By considering key data elements predicted for a number of preceding image data structures, the history of the key data element's motion is taken into account when determining a classification. In particular, when determining a class label indicating a motion phase or an evaluation point, the previous motion of the key data elements is taken into account. Additionally or alternatively, future image data structures may be taken into account. As a consequence, a more accurate classification is obtained.

Preferably, the input data for each second ML model comprises a set of parameters including the key data elements predicted for the image data structure under consideration.

Preferably, the input data for each second ML model comprises additional attributes for classification, said additional attributes being derived from key data elements predicted for the image data structure under consideration and for at least one of: at least one preceding image data structure, at least one future image data structure. These additional attributes may for example comprise parameters such as a minimum coordinate value of a particular key data element's position within a certain set of image data structures, or any other additional attribute derived from the key data elements' positions. In particular, the additional attributes may be chosen such that the classification task performed by the second ML model is promoted and simplified.

Preferably, the first ML model is a neural network. A neural network is well-suited for identifying landmarks in an image data structure and for predicting the positions of respective key data elements. Further preferably, the first ML model is a convolutional neural network.

Preferably, at least one of the second ML models is a classification model. A classification model is an ML model that is configured for determining, for each image data structure, a corresponding class label, the class label indicating for example a certain motion phase and/or an evaluation point.

In a preferred embodiment, at least one of the second ML models is a decision tree or a random forest comprising at least one decision tree. A decision tree may be descended starting at a root node, wherein each node of the tree acts as a test case for some attribute, and wherein the leaf node indicates a class label. In this regard, a decision tree is well-suited for performing a classification task. A random forest comprises a plurality of separate decision trees, wherein each decision tree of the random forest determines a class label and wherein the classification with the most votes decides the final classification.

Preferably, the decision tree or the random forest is configured for providing a class label for each image data structure of the sequence of image data structures.

According to a preferred embodiment, at least one second ML model is configured for determining class labels for at least one motion phase and for at least one evaluation point, wherein there is a predefined correlation between the at least one motion phase and the at least one evaluation point, with an evaluation point being a specific point of time within a motion phase or between consecutive motion phases.

In a preferred embodiment, the ML model arrangement further comprises at least one geometric evaluation unit, wherein the geometric evaluation unit is configured for performing a geometric evaluation of at least one of the key data elements predicted for an image data structure or for performing a geometric evaluation of at least one motion phase of a specific motion pattern. The geometric evaluation unit may for example be configured for geometrically evaluating a configuration of key data elements predicted for an image data structure or of a subset of these key data elements. In particular, the geometric evaluation unit may for example be configured for evaluating at least one of distances between key data elements, angles between key data elements, proportions between key data elements or sets of key data elements, relations between key data elements or sets of key data elements, etc. Additionally or alternatively, the geometric evaluation unit may for example be configured for evaluating at least one motion phase determined by at least one of the second ML models.

Preferably, the ML model arrangement is configured such that whenever a second ML model identifies that a certain image data structure is an evaluation point, a geometric evaluation of the configuration of key data elements predicted for the respective image data structure is initiated. For each evaluation point identified by a second ML model, a further geometric evaluation of the configuration of key data elements of the image data structure that corresponds to the evaluation point is performed.

Further preferably, evaluating a motion pattern comprises evaluating at least one motion phase determined by at least one of the second ML models. Preferably, the ML model arrangement is configured for evaluating at least one motion phase determined by at least one of the second ML models.

In a preferred embodiment, the ML model arrangement is configured for evaluating a sequence of image data structures showing a person doing physical exercising. The ML model arrangement can for example be used for evaluating a single physical exercise or several repetitions of a physical exercise. For each physical exercise, a corresponding second ML model that has been trained on this physical exercise may for example be used for identifying at least one motion phase and/or at least one evaluation point of the respective physical exercise.

Preferably, the first ML model is configured for predicting a representation of the person's body for each image data structure of the sequence of image data structures. For example, the person's body may be represented by a 3D mesh.

Preferably, the first ML model is configured for predicting a set of body key points for each image data structure of the sequence of image data structures. Body key points may for example be assigned to joints of the body and to body features like for example the forehead, the chin, the breastbone, the hip, etc. Preferably, the body key points identified for an image data structure form a skeleton of the human body and allow for detecting the human body's pose in the respective image data structure.

Preferably, a specific motion pattern corresponds to a particular physical exercise. Preferably, for each physical exercise, a dedicated second ML model is provided. Further preferably, the ML model arrangement comprises a first ML model configured for predicting body key points for each image data structure and a plurality of second ML models corresponding to a variety of different physical exercises to be analysed.

Preferably, at least one of the second ML models is an exercise specific second ML model configured for evaluating a specific physical exercise, the exercise specific second ML model being configured for determining class labels for at least one of: at least one motion phase of the specific physical exercise, at least one evaluation point of the specific physical exercise.

In a preferred embodiment, the ML model arrangement is configured such that whenever a second ML model corresponding to the physical exercise identifies that a certain image data structure is an evaluation point, a geometric evaluation of a particular pose at the respective evaluation point is initiated. In this regard, each evaluation point identified by the second ML model may for example relate to a particular pose that is to be evaluated in more detail.

Preferably, evaluating a particular pose comprises comparing one or more of the body key points related to the particular pose and/or one or more parameters derived therefrom with one or more predefined constraints related to the particular pose at the respective evaluation point. The one or more constraints may for example define how the pose at the particular evaluation point should look. In this regard, the one or more constraints may for example comprise constraints related to distances between body key points, constraints related to angles between body key points, constraints related to proportions between body key points or sets of body key points, etc.

Preferably, the ML model arrangement comprises a feedback unit configured for providing a feedback to the user in dependence on the result of the evaluation of the particular pose. By providing feedback, the user may for example be informed whether or not the exercise is performed correctly. Furthermore, the user may be informed on how to improve the way the exercise is performed. Preferably, the feedback is based on determining a deviation between the user's pose and the ideal pose at a certain evaluation point.

Method for Evaluating a Motion Pattern

Preferably, for each image data structure of the sequence of image data structures, a corresponding class label is determined.

Preferably, class labels are determined based on input data comprising key data elements predicted for the image data structure under consideration and for at least one of: at least one preceding image data structure, at least one future image data structure.

According to a preferred embodiment, using the second ML model, class labels are determined for at least one motion phase and for at least one evaluation point, wherein there is a predefined correlation between the at least one motion phase and the at least one evaluation point, with an evaluation point being a specific point of time within a motion phase or between consecutive motion phases.

In a preferred embodiment, the method further comprises initiating, whenever a certain image data structure is identified as an evaluation point, a geometric evaluation of the configuration of key data elements predicted for the respective image data structure.

Further preferably, the method comprises evaluating at least one motion phase determined by at least one of the second ML models.

According to a preferred embodiment, the method comprises evaluating a sequence of image data structures showing a person doing physical exercising.

Preferably, for each image data structure of the sequence of image data structures, a representation of the person's body is predicted.

Preferably, for each image data structure of the sequence of image data structures, a set of body key points is predicted.

Preferably, a specific motion pattern corresponds to a particular physical exercise.

Preferably, the method further comprises initiating, whenever a second ML model corresponding to the physical exercise identifies that a certain image data structure is an evaluation point, a geometric evaluation of a specific pose at the respective evaluation point.

In a preferred embodiment, evaluating a particular pose comprises comparing one or more of the body key points related to the particular pose and/or one or more parameters derived therefrom with one or more predefined constraints related to the particular pose at the respective evaluation point.

Preferably, the method comprises providing a feedback to the user in dependence on the result of the evaluation of the particular pose.

Preferably, the first ML model is a neural network.

In a preferred embodiment, each second ML model is a ML model configured for evaluating a specific motion pattern.

In a preferred embodiment, at least one of the second ML models is an exercise specific second ML model configured for evaluating a specific physical exercise, the exercise specific second ML model being configured for determining class labels for at least one of: at least one motion phase of the specific physical exercise, at least one evaluation point of the specific physical exercise and at least one phase without physical exercising.

Preferably, at least one of the second ML models is a decision tree or a random forest comprising at least one decision tree.

Method for Training a Second ML Model

Preferably, the second ML model is a decision tree or a random forest comprising at least one decision tree.

Preferably, after the training step, the second ML model is configured for evaluating a specific motion pattern. Training of a second ML model may for example be based on a large number of sequences of image data structures showing a motion pattern, together with class labels provided for each image data structure. After the training step has been performed, the trained second ML model can be used for evaluating a specific motion pattern.

In a preferred embodiment, after the training step, the second ML model is configured for determining class labels for the image data structures of a sequence of image data structures showing the specific motion pattern, said class labels identifying at least one of: at least one motion phase of the specific motion pattern, at least one evaluation point of the specific motion pattern.

BRIEF DESCRIPTION OF THE DRAWING

The invention is illustrated in greater detail with the aid of schematic drawings. It shows schematically:

FIG. 6 shows a part of the dashboard's graphical user interface that is used for defining constraints and feedback data.

DETAILED DESCRIPTION OF EMBODIMENTS OF THE INVENTION

Figure 1:
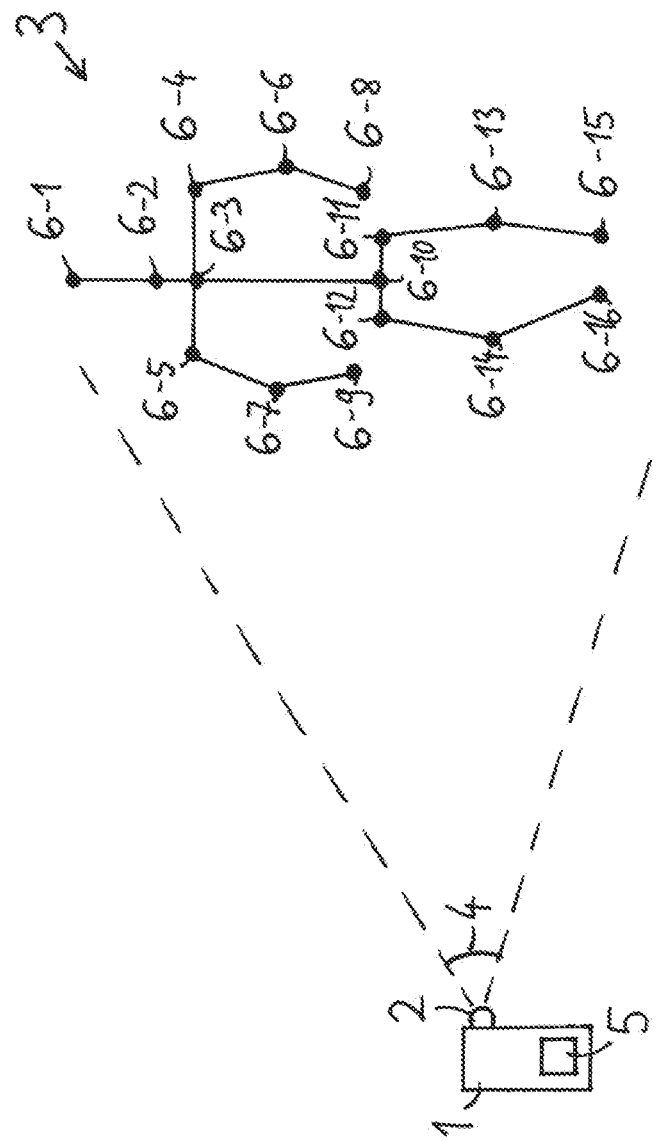
FIG. 1 shows a mobile device configured for predicting body key points indicating a person's posture for a sequence of image frames.

In the following description of preferred embodiments of the present invention, identical reference numerals denote identical or comparable components.

In the following, a system for acquiring a sequence of image frames showing a person performing physical exercising and for analysing the person's motion is described. The system may for example be configured for evaluating various different physical exercises. In this regard, physical exercising may comprise performing one single physical exercise, like for example a plank. Physical exercising may also comprise performing several repetitions of a physical exercise, like for example several repetitions of a squat. Physical exercising may also comprise yoga sequences comprising one or more specific poses.

FIG. 1 shows how the sequence of image frames showing the person's physical exercising is acquired. A mobile device 1 with a camera 2 is located at a distance from a person 3 performing physical exercises. The mobile device 1 may for example be a smartphone, a tablet, a laptop, etc. Preferably, the mobile device 1 is arranged such that the entire body of the person 3 is within the camera's field of view 4. In this position, the mobile device 1 can acquire a sequence of image frames, preferably a video sequence of the person's movements.

On the mobile device 1, a software application 5 may be implemented, the software application 5 comprising a dedicated machine learning model like for example a neural network configured for predicting, for each image frame, a set of body key points indicating the posture of the person's body. In the example shown in FIG. 1, the person's posture is described by the respective positions of 16 different body key points 6-1 to 6-16. The body key points 6-1 to 6-16 may for example be assigned to the joints of the body and to body features like for example the forehead, the chin, the breastbone, the hip, etc. The body key points 6-1 to 6-16 form a skeleton of the human body and allow for detecting the orientation of different parts of the body relative to each other. Instead of the set of body key points, any other representation of the person's body may be used for describing the person's posture, like for example a 3D mesh of the person's body. By tracking the positions of the body key points or any other representation of the person's body in the sequence of image frames, the person's movements when performing the physical exercise can be evaluated. The camera 2 may for example be a 2D-camera, a 2.5D-camera or a 3D-camera. The body key points 6-1 to 6-16 predicted for each image frame may for example be 2D-points, 2.5D-points or 3D-points.

Preferably, the software application 5 for processing the acquired image frames is implemented on the mobile device 1 itself. In an alternatively preferred embodiment, a stationary computer with a camera is used for acquiring the image frames and for processing the image data. In yet another preferred embodiment, the mobile device comprises a camera and a wireless interface for configured for transmitting the image frames to a remote computer or to a cloud server. In this embodiment, the neural network for predicting key points based on the sequence of image frames is implemented on the remote computer or on the cloud server. In yet another preferred embodiment, a camera is coupled with a transmitter, with the transmitter being configured for transmitting the acquired image frames to a remote computer or to a cloud server for further processing.

Figure 2:
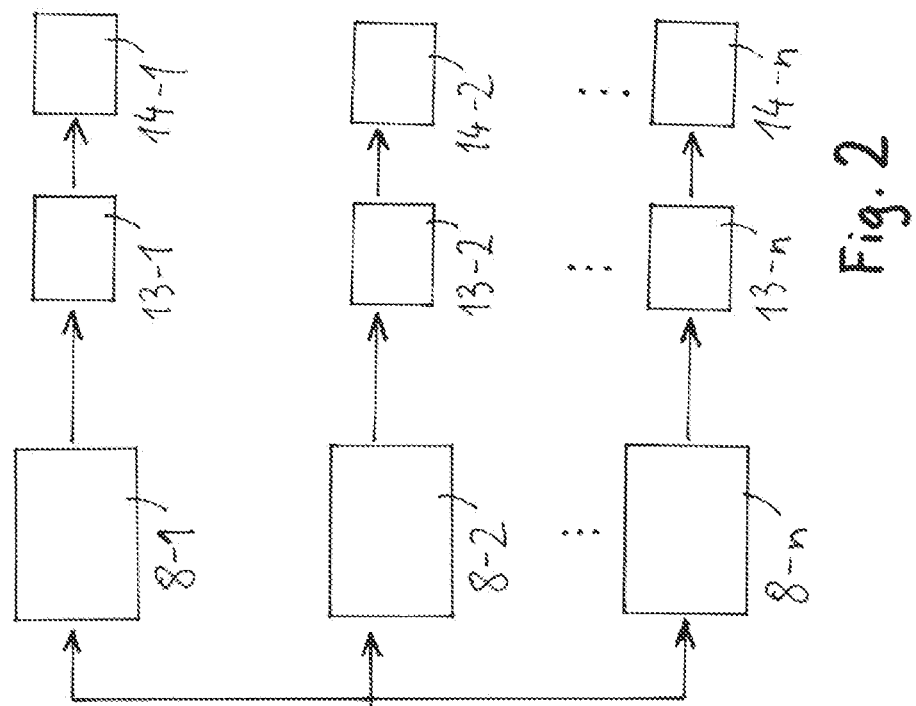
FIG. 2 shows an arrangement of several machine learning models configured for evaluating a person's movement when performing a physical exercise.

FIG. 2 shows an example implementation of the software application 5 comprising an arrangement of different machine learning models. The software application 5 shown in FIG. 2 comprises a pose estimation model 7 and a plurality of classification models 8-1 to 8-$n$.

A sequence of image frames 9 acquired by the camera 2 is provided to the pose estimation model 7. The image frames 9 provided to the pose estimation model 7 may for example comprise two-dimensional image data in three different colours, which may for example be represented as a 1024×1024×3 pixel data structure. The pose estimation model 7 is configured for predicting, for each image frame 9, a plurality of body key points 6-1 to 6-16.

The output of the pose estimation model 7 may for example comprise a set of feature maps 10, with each of the feature maps 10 corresponding to one particular body key point. Hence, for predicting sixteen body key points, the pose estimation model 7 will provide a set of sixteen feature maps per image frame. In this example, a data structure with 64×64×16 pixels may for example be obtained as an output of the pose estimation model 7.

Figure 3:
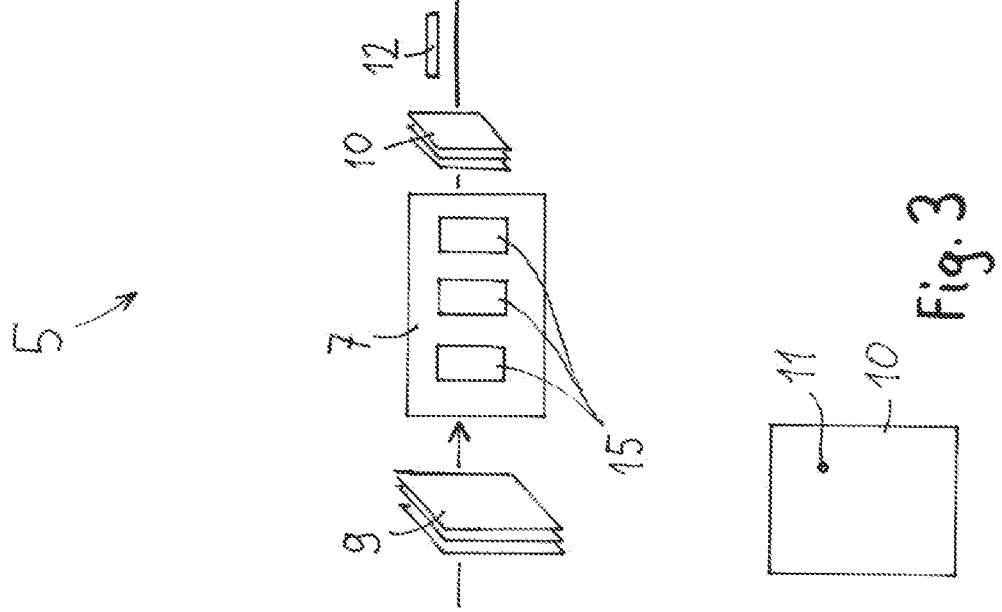
FIG. 3 shows a feature map indicating a position of a particular body key point.

As shown in FIG. 3, a feature map 10 is a two-dimensional matrix indicating respective probabilities for each position that the respective body key point is located at that position. The position with the highest probability corresponds to the body key point's position 11. Hence, the easiest technique is to use the point with the highest probability as the body key point's position. Alternatively, the position of the maximum probability may for example be determined by using Gaussian fitting or a similar technique.

In this regard, each of the sixteen feature maps yields the position of one of the sixteen body key points 6-1 to 6-16. The thus determined sixteen body key points together form a skeleton representation of the person's posture in the corresponding image frame. Alternatively, the pose estimation model 7 may for example provide any other representation of the person's body, like for example a 3D mesh of the person's body or a skeleton representation. In any case, the pose estimation model 7 provides a representation of the person's posture in a particular image frame.

The software application 5 shown in FIG. 2 further comprises a plurality of classification models 8-1 to 8-*n*, wherein for each physical exercise to be evaluated, a dedicated classification model is provided, said classification model being trained for classifying motion phases, rest phases and evaluation points of this particular physical exercise.

The classification task performed by the classification models 8-1 to 8-*n* is based on the skeleton representations obtained at the output of the pose estimation model 7. For each image frame, a feature vector 12 comprising a number of entries is forwarded, as an input, to one of the classification models 8-1 to 8-*n* that corresponds to the physical exercise performed by the user. The feature vector 12 comprises body key points of the image frame under consideration and body key points of a number of preceding image frames, for example body key points of four preceding image frames. Alternatively or additionally, the feature vector may comprise body key points of future image frames, which may further improve the accuracy of the classification. In this case, a time delay will occur until the feature vector 12 can be forwarded to one of the classification models 8-1 to 8-*n*. The feature vector 12 may comprise all body key points of the skeleton representation or a just a subset of these body key points, and it may further comprise additional parameters derived from the body key points. Providing further parameters in addition to the body key points may promote the classification task performed by the classification models 8-1 to 8-*n*.

Based on this feature vector 12, the classification model classifies the particular image frame under consideration. Possible classifications include one or more motion phases, like for example a downward motion or an upward motion, a rest phase, and one or more evaluation points. At the one or more evaluation points, a further geometric evaluation of the person's pose at this evaluation point is performed.

Preferably, there is a predefined correlation between the one or more motion phases of the motion pattern and the at least one evaluation point. An evaluation point may for example be a specific point of time within a particular motion phase, for example a start point, an intermediate point or an end point of the particular motion phase. For example, the evaluation point may be a point of time where a reversal of the body's movement occurs. According to a further example, an evaluation point may be a point of time within a motion phase where a characteristic parameter, for example a characteristic parameter derived from key points of the image frames, assumes a minimum or a maximum value. According to a further example, an evaluation point may be located at a transition between two consecutive motion phases. For example, in case of a squat, an evaluation point may be located at the transition from the downward motion phase to the upward motion phase.

Whenever an evaluation point is identified by one of the classification models 8-1 to 8-*n*, a geometric evaluation 13-1 to 13-*n* of the person's pose at this evaluation point is performed. For evaluating the pose, body key points related to the person's pose at the evaluation point or parameters derived therefrom are compared with one or more predefined geometric constraints. The geometric constraints define an ideal pose of the person at this evaluation point. In dependence on the outcome of the geometric evaluation, a feedback 14-1 to 14-*n*, for example an audio feedback or a text message, is provided to the person.

Alternatively, motion phases could be analysed directly. Ways of analysing could for example comprise evaluating the timing of the motion phase or analysing the curve of a specific characteristic parameter, for example a curve that indicates the movement of the left hip, with regard to its smoothness or with regard to the value of this curve's derivative within this motion phase.

Firstly, the pose estimation model 7 will be discussed in more detail. The pose estimation model 7 may for example be implemented as a convolutional neural network configured for determining respective positions of body key points in the image frames 9 of a sequence of image frames. The convolutional neural network comprises a sequence of consecutive layers 15 configured for processing the image data, with the layers 15 comprising one or more of the following: at least one convolutional layer, at least one non-linear layer, at least one pooling layer, at least one classifier, at least one fully connected layer. For example, a neural network with a stacked hourglass architecture may be employed, as described in the article by A Newell, K Yang and J Deng "Stacked hourglass networks for human pose estimation", European Conference on Computer Vision, October 2016, pp 483-499, Springer International Publishing, https://arxiv.org/abs/1603.06937.

Next, the classification models 8-1 to 8-*n* will be discussed in more detail. For performing the classification task, a machine learning model like for example a decision tree or a random forest comprising a plurality of decision trees may be used. In the following, a classification model based on a decision tree is described.

Decision trees are a method for the automatic classification of data objects and thus for solving decision problems. A decision tree always consists of a root node, any number of inner nodes, and at least two leafs. Each node represents a decision rule and each leaf represents a classification, i e an answer to the decision problem. Decision tree learning uses a decision tree as a predictive model to go from observations about an item (represented in the branches) to conclusions about the item's target value represented in the leafs. Tree models where the target variable can take a discrete set of values are called classification trees.

Classification comprises a learning step for developing the model based on given training data. In a subsequent prediction step, the model can be used for predicting the classification for given data.

The learning step is based on a large amount of training data, wherein for each data item, a corresponding classification is known. In the present case, a large amount of video data showing different people performing a particular physical exercise, for example a squat, is acquired and for each image frame, a corresponding classification is specified. Said classifications may for example comprise a rest phase, one or more motion phases, one or more evaluation points. In particular, for a squat, the possible classifications may comprise the rest position, a downward movement, an evaluation point at the lowest point of the person's movement and an upward movement. In this example, the evaluation point is located at the transition between the downward motion phase and the upward motion phase. The training data may also comprise physical exercises performed in an erroneous manner, in order to be able to classify erroneously performed exercises.

Based on this training data, the decision tree is constructed in a top-down approach. At first, the attribute of the feature vector having the highest predictive value for the classification task is determined. For selecting the attribute having the highest predictive value, an attribute selection measure (ASM) is determined. Most popular selection measures are information gain, gain ratio, and Gini index. The best score attribute will be selected as a splitting attribute.

This attribute is made a decision node, and based on this attribute's value, the training data set is split into smaller subsets. Tree-building is continued by repeating this process recursively for each child node. For a child node, the attribute having the second-highest predictive value is determined, and this attribute is made a further decision node configured for splitting the subset at the child note into smaller subsets. This process is continued until the leaf nodes of the decision tree yield a proper classification for each possible feature vector.

After the classification model has been trained, the model can be used for predicting the classification of an arbitrary feature vector. In particular, the decision tree may classify a given feature vector by sorting the feature vector's attributes down the tree from the root to some leaf node, with the leaf node providing the classification of the respective feature vector. This approach is called a top-down approach. Each node in the tree acts as a test case for some attribute, and each edge descending from that node corresponds to one of the possible answers to the test case. This process is repeated until the leaf node indicating a classification is reached. For example, in case of a squat, the possible classifications for a given feature vector may for example comprise "rest position", "downward movement", "evaluation point", "upward movement".

For improving the predictive power of the classification model, a random forest comprising a plurality of uncorrelated decision trees may be used instead of a single decision tree. In this case, each tree in the forest may make a decision and the classification with the most votes decides the final classification.

The different classification models 8-1 to 8-n shown in FIG. 2 correspond to different physical exercises. For each physical exercise, the corresponding classification model may be trained based on a certain amount of video sequences showing different persons performing one particular physical exercise in a variety of different ways.

Figure 4:
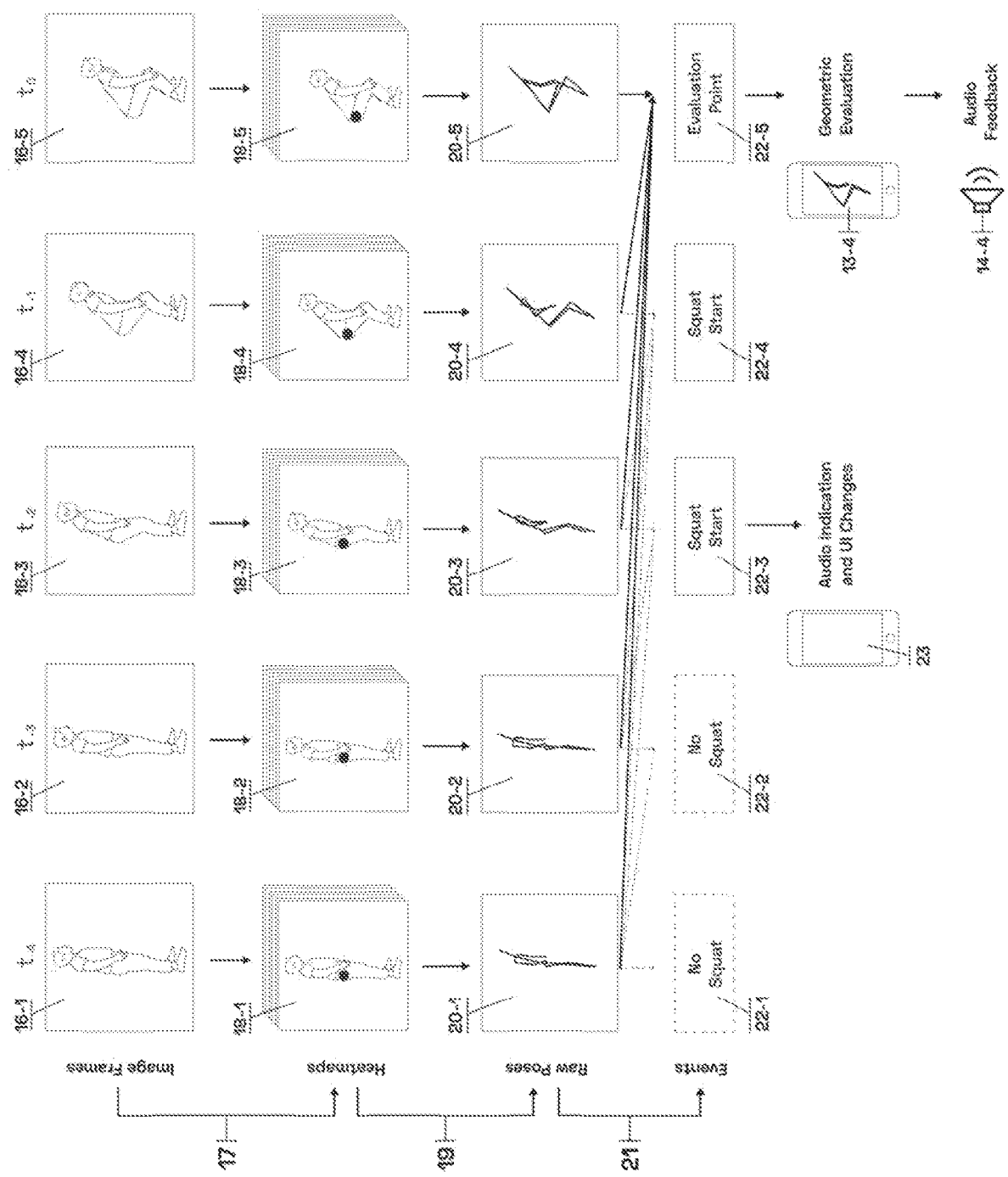
FIG. 4 shows how a sequence of image frames showing a person performing a physical exercise is analysed by the machine learning models.

In FIG. 4, an overview of the method for evaluating a person's movement when performing physical exercising is given. In the first row of FIG. 4, a sequence of image frames 16-1 to 16-5 showing a person performing a squat is given. The five image frames 16-1 to 16-5 have been acquired at five different points of time t4, t3, t0.

In a first step 17, the image frames 16-1 to 16-5 are input to the pose estimation model 7, which delivers, for each of the image frames, a corresponding set of sixteen feature maps indicating the respective positions of the sixteen body key points. In the second row of FIG. 4, for each of the image frames 16-1 to 16-5, the corresponding feature maps 18-1 to 18-5 are shown.

In a subsequent step 19, a skeleton representation of the person's pose is provided by determining the respective positions of the body key points in the feature maps 18-1 to 18-5. Alternatively, a different representation of the person's body like for example a 3D mesh may be provided. The skeleton representations 20-1 to 20-5 are depicted in the third row of FIG. 4.

In a subsequent step 21, the skeleton representations 20-1 to 20-5 of five consecutive image frames or a subset of these representations are provided as input data to the classification model that corresponds to the exercise "squat", for example to the classification model 8-4. The skeleton representations are provided as a feature vector 12 to the classification model 8-4.

Based on this input data, the classification model 8-4 provides a classification for each one of the image frames 16-1 to 16-5. For the first two image frames 16-1, 16-2, the classification model 8-4 provides the class labels 22-1 and 22-2, which indicate "no squat". For image frames 16-3, 16-4, the classification model 8-4 provides the class labels 22-3 and 22-4, which indicate "squat start". The class label "squat start" triggers an audio indication 23 as well as user interface changes. In image frame 16-5, the person has reached the lowest position of the squat and accordingly, the classification model 8-4 outputs the class label 22-5 "evaluation point". In this example, the evaluation point is located at the transition between the downward motion phase and the upward motion phase. The class label "evaluation point" triggers a further geometric evaluation 13-4 of the person's pose in image frame 16-5. For example, the angles between different joints are compared with predefined constraints, the distances between neighbouring joints are evaluated, etc. In dependence on the outcome of the geometric evaluation 13-4, an audio feedback 14-4 is provided to the user. For example, the user may be asked to keep his head straight, to keep the hands next to the knees, etc.

Figure 5:
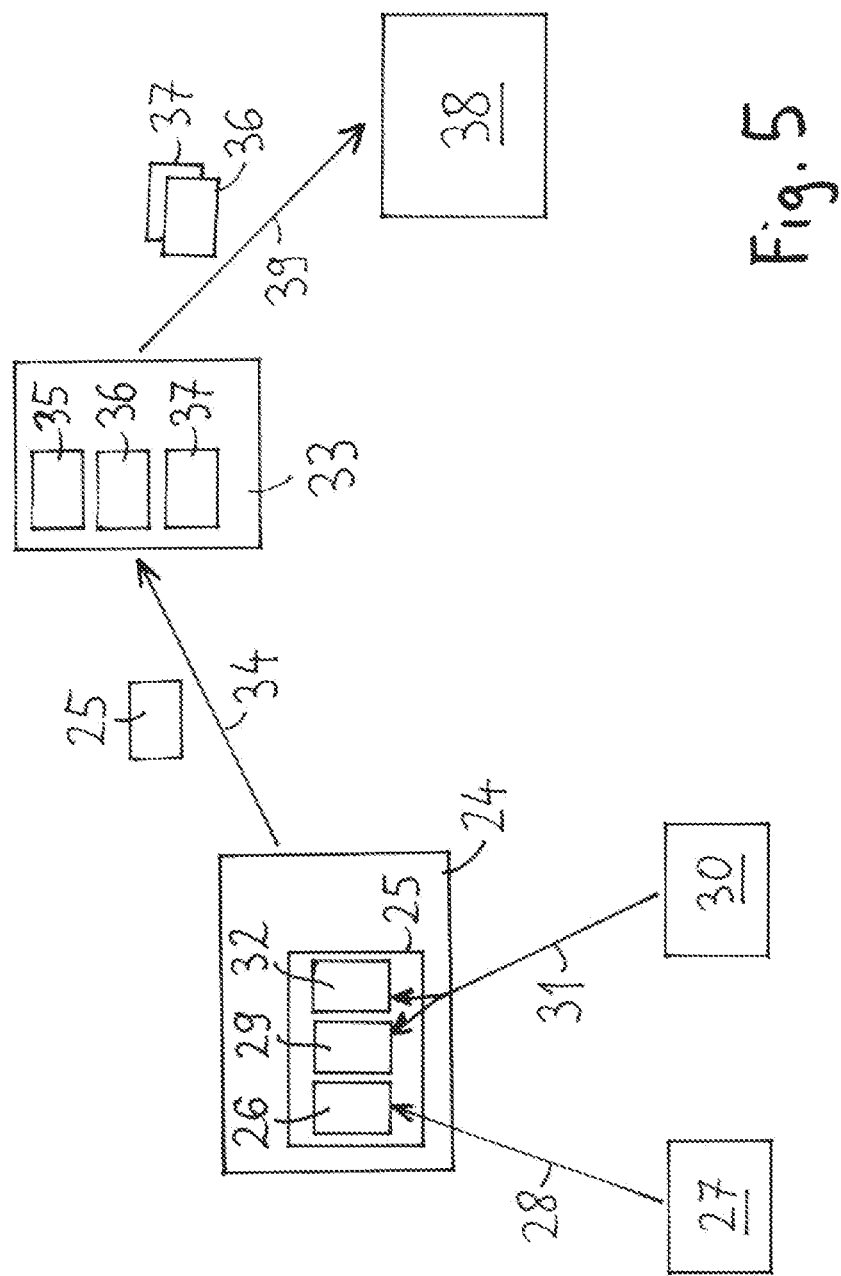
FIG. 5 shows a dashboard that is used for setting up and configuring data structures for evaluating a particular physical exercise.

FIG. 5 shows how a dashboard, for example a web-based dashboard, is used for setting up a data structure representing one particular physical exercise. The dashboard 24 may for example be a web-based application that allows for accessing a data structure 25 via one or more access paths, for example via login and password. The dashboard 24 provides a graphical user interface that allows for interactively editing the data structure 25.

The data structure 25 may for example comprise three different components. The first component is a classification model artifact 26 configured for identifying rest positions, motion phases and evaluation points of one particular physical exercise, for example a squat. The classification model artifact 26 may either be the machine learning model itself or some kind of representation of the machine learning model, for example attributes and parameters of the machine learning model.

The classification model artifact 26 may for example be set up and configured by a machine learning engineer 27. The machine learning engineer 27 is responsible for performing the learning step of the classification model based on a large amount of video data showing different persons performing one particular physical exercise in different possible ways. Based on this training data, the classification model is trained for performing a classification of motion phases, rest phases and evaluation points of this particular exercise. In case of a squat, the classification model may for example be trained for recognising a rest position, a downward movement, an evaluation point, which is the lowest point of the person's movement, and an upward movement. After the step of training the classification model has been performed, either the classification model itself or the characteristic attributes and parameters of this model may be uploaded to the dashboard 24 via an access path 28. The classification model artifact 26 is the first component of the data structure 25.

For a certain physical exercise, the classification model may define one or more evaluation points. At each evaluation point, an evaluation of the person's pose at this point of time is performed, and based on this evaluation, feedback is provided to the person. There may exist a predefined interdependency between the one or more motion phases of the motion pattern and the one or more evaluation points. For example, in case of a squat, the person's pose at its lowest point is evaluated.

For performing this evaluation, the data structure 25 comprises, as a second component, evaluation data 29. The evaluation data 29 may for example comprise a set of geometric constraints for a particular pose. Such constraints may for example define an angular range between three body key points, distances between different body key points or any other kind of geometric proportions and relations that are characteristic for a particular pose. In case an exercise is not performed in a correct manner and the constraints as defined in the evaluation data 29 are not fulfilled, a feedback is provided to the person performing the exercise. The evaluation data 29 may be configured by a physiotherapist or by a doctor 30. For setting up the evaluation data 29, the physiotherapist or doctor 30 may access the graphical user interface of the web-based dashboard 24 or a dedicated sub-area of this graphical user interface via an access path 31.

The feedback may for example be audio feedback or a text message displayed to the user. The data structure 25 comprises feedback data 32 as a third component. The feedback data 32 may also be set up by the physiotherapist or doctor 30 by accessing the graphical user interface of the dashboard 24 or a dedicated sub-area thereof.

FIG. 6 shows a part of the graphical user interface of the dashboard 24 that may be accessed by the physiotherapist or doctor 30 in order to specify constraints and feedback data. The example of FIG. 6 relates to a physical exercise called a "plank". In this physical exercise, a person assumes a horizontal position, wherein the body forms a straight line. The constraint 40 relates to the angle between the body key points of the thorax, the pelvis and the left knee. The constraint 40 defines that for correctly performing a plank, the angle between thorax, pelvis and left knee has to exceed 170°. In case this constraint 40 is not fulfilled and the angle between thorax, pelvis and left knee is below 170°, the hip is hanging through, which is not correct. In this case, an audio feedback is provided to the user. This audio feedback is specified in the lower section of FIG. 6. If the constraint is not met for the first time, the audio feedback 41 "Lift your hip a bit so that your body forms one line" is output. In case the constraint is still not fulfilled, a second audio feedback 42 "Lift your hip still a bit more" is output. In case the user's performance has improved, but the constraint is still not met, the audio feedback 43 "Great! Now lift your hip a bit so that your body forms one line" is output. The feedback may be specified by the physiotherapist or doctor 30 as an audio file. Alternatively, the audio feedback may be specified as a text message that is automatically converted into an audio message. As further option, a text message may be displayed to the user on the display of the mobile device.

As soon as the classification model artifact 26, the evaluation data 29 and the feedback data 32 have been specified, all the data required for analysing and evaluating a respective physical exercise is complete. The data structure 25 may for example be a JSON-file according to the standard JavaScript Object Notation, with the JSON-file comprising an URL of the classification model, an URL of the pose model, evaluation data 29 and feedback data 32 encapsulated as one single file containing all information required for evaluating one particular physical exercise. The data structure 25 is transmitted to a database 33, as indicated by arrow 34. In the database 33, a plurality of data structures 35, 36, 37 related to different physical exercises are stored. Each of the data structures 35, 36, 37 comprises the three components classification model artifact, evaluation data and feedback data.

A mobile device 38 may now access the database 33 and download one or more data structures 36, 37 from the database 33 to the mobile device 38, as indicated by arrow 39. On the part of the mobile device 38, the downloaded data structures can be used for analysing and evaluating the movement of a person performing a physical exercise that corresponds to one of the data structures 36, 37.

The features described in the above description, claims and figures can be relevant to the invention in any combination.

The invention claimed is:

1. A machine learning (ML) model arrangement configured for evaluating motion patterns in a sequence of image data structures, the ML model arrangement comprising:
   a first ML model configured for predicting a set of key data elements for each image data structure of the sequence of image data structures, each key data element indicating a respective position of a landmark in the image data structure;
   at least one second ML model, each second ML model being a ML model configured for evaluating a corresponding specific motion pattern, each second ML model being configured for determining, based on input data comprising at least one of the key data elements predicted by the first ML model for at least one image data structure or data derived therefrom, class labels for each image data structure, said class labels identifying at least one of: at least one motion phase of the specific motion pattern, at least one evaluation point of the specific motion pattern,
   wherein said at least one evaluation point is a point in time.

2. The ML model arrangement according to claim 1, wherein each second ML model is configured for determining class labels based on input data comprising key data elements predicted for the image data structure under consideration and for at least one of: at least one preceding image data structure, at least one future image data structure.

3. The ML model arrangement according to claim 1, wherein the first ML model is a neural network.

4. The ML model arrangement according to claim 1, wherein at least one of the second ML models is a classification model.

5. The ML model arrangement according to claim 1, wherein at least one of the second ML models is a decision tree or a random forest comprising at least one decision tree.

6. The ML model arrangement according to claim 1, wherein at least one second ML model is configured for determining class labels for at least one motion phase and for at least one evaluation point, wherein there is a predefined correlation between the at least one motion phase and the at least one evaluation point, with an evaluation point being a specific point of time within a motion phase or between consecutive motion phases.

7. The ML model arrangement according to claim 1, wherein the ML model arrangement further comprises at least one geometric evaluation unit, wherein the geometric evaluation unit is configured for performing a geometric evaluation of at least one of the key data elements predicted for an image data structure or for performing a geometric evaluation of at least one motion phase of a specific motion pattern.

8. The ML model arrangement according to claim 1, wherein the ML model arrangement is configured such that whenever a second ML model identifies that a certain image data structure is an evaluation point, a geometric evaluation of the configuration of key data elements predicted for the respective image data structure is initiated.

9. The ML model arrangement according to claim 1, wherein the ML model arrangement is configured for evaluating at least one motion phase determined by at least one of the second ML models.

10. The ML model arrangement according to claim 1, wherein the ML model arrangement is configured for evaluating a sequence of image data structures showing a person doing physical exercising.

11. The ML model arrangement according to claim 10, wherein the first ML model is configured for predicting a representation of the person's body for each image data structure of the sequence of image data structures.

12. The ML model arrangement according to claim 10, wherein the first ML model is configured for predicting a set of body key points for each image data structure of the sequence of image data structures.

13. The ML model arrangement according to claim 10, wherein at least one of the second ML models is an exercise specific second ML model configured for evaluating a specific physical exercise, the exercise specific second ML model being configured for determining class labels for at least one of: at least one motion phase of the specific physical exercise, at least one evaluation point of the specific physical exercise.

14. The ML model arrangement according to claim 10, wherein the ML model arrangement is configured such that whenever a second ML model corresponding to the physical exercise identifies that a certain image data structure is an evaluation point, a geometric evaluation of a particular pose at the respective evaluation point is initiated.

15. The ML model arrangement according to claim 14, wherein the ML model arrangement comprises a feedback unit configured for providing a feedback to the user in dependence on the result of the evaluation of the particular pose.

16. A mobile device comprising the ML model arrangement according to claim 1.

17. A method for evaluating a motion pattern in a sequence of image data structures, the method comprising
predicting, using a first machine learning (ML) model, a set of key data elements for each image data structure of the sequence of image data structures, each key data element indicating a respective position of a landmark in the image data structure; and
determining, using a second ML model, class labels for each image data structure based on input data comprising at least one of the key data elements predicted by the first ML model for at least one image data structure or data derived therefrom, said class labels identifying at least one of: at least one motion phase of the specific motion pattern, at least one evaluation point of the specific motion pattern,
wherein said at least one evaluation point is a point in time.

18. The method according to claim 17, wherein the method further comprises initiating, whenever a certain image data structure is identified as an evaluation point, a geometric evaluation of the configuration of key data elements predicted for the respective image data structure.

19. The method according to claim 17, wherein the method further comprises evaluating at least one motion phase determined by at least one of the second ML models.

20. The method according to claim 17, wherein the method comprises evaluating a sequence of image data structures showing a person doing physical exercising.

21. A method for configuring a second machine learning (ML) model for evaluating a specific motion pattern, the method comprising
training the second ML model for classifying at least one of: at least one motion phase of the specific motion pattern, at least one evaluation point of the specific motion pattern, wherein said at least one evaluation point is a point in time, wherein said training is based on a plurality of sequences of image data structures showing different variants of the specific motion pattern, and wherein for each image data structure, a set of key data elements is provided, each key data element indicating a respective position of a landmark in the image data structure, said training being further based on class labels provided for each image data structure.

22. The method according to claim 21, wherein after the training step, the second ML model is configured for determining class labels for the image data structures of a sequence of image data structures showing the specific motion pattern, said class labels identifying at least one of: at least one motion phase of the specific motion pattern, at least one evaluation point of the specific motion pattern.

23. A mobile device, including:
a camera configured to capture a sequence of image data structures of a person; and
a machine learning (ML) model arrangement evaluating motion patterns in a sequence of image data structures, the ML model arrangement comprising:
a first ML model predicting a set of key data elements for each image data structure of the sequence of image data structures, each key data element indicating a respective position of a landmark in the image data structure; and
at least one second ML model, each second ML model being a ML model: evaluating a corresponding specific motion pattern, and determining, based on input data comprising at least one of the key data elements predicted by the first ML model for at least one image data structure or data derived therefrom, class labels for each image data structure, said class labels identifying at least one of: at least one a motion phase or an evaluation point of the specific motion pattern, at least one evaluation point of the specific motion pattern,
wherein said at least one evaluation point is a point in time.

24. A method for evaluating a motion pattern in a sequence of image data structures captured by a camera of a mobile device, the method comprising:
predicting, using a first machine learning (ML) model, a set of key data elements for each image data structure of the sequence of image data structures, each key data element indicating a respective position of a landmark in the image data structure; and
determining, using a second ML model separate from the first ML model, class labels for each image data structure based on input data comprising at least one of the key data elements predicted by the first ML model for at least one image data structure or data derived therefrom, said class labels identifying at least one of: at least one a motion phase or an evaluation point of the specific motion pattern, at least one evaluation point of the specific motion pattern,
wherein said at least one evaluation point is a point in time.

* * * * *